(12) United States Patent
Arce et al.

(10) Patent No.: US 7,878,544 B2
(45) Date of Patent: Feb. 1, 2011

(54) SEAL FOR STEERING ASSEMBLIES

(75) Inventors: Francisco Arce, Lake Orion, MI (US); Jeffrey Harrell, Shelby Township, MI (US); John W. Joyce, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 353 days.

(21) Appl. No.: 11/949,272

(22) Filed: Dec. 3, 2007

(65) Prior Publication Data

US 2008/0128999 A1 Jun. 5, 2008

Related U.S. Application Data

(60) Provisional application No. 60/868,142, filed on Dec. 1, 2006.

(51) Int. Cl.
*B62D 1/16* (2006.01)
(52) U.S. Cl. ..................................................... 280/779
(58) Field of Classification Search ................. 277/361, 277/392, 634, 636, 644, 648; 280/779, 780; 403/50, 51; 464/173
See application file for complete search history.

(56) References Cited

U.S. PATENT DOCUMENTS

| 3,842,621 | A | * | 10/1974 | Mazziotti | ..................... | 464/171 |
| 4,826,466 | A |   | 5/1989 | Triquet | | |
| 4,840,386 | A | * | 6/1989 | Peitsmeier et al. | .......... | 277/636 |
| 5,813,288 | A |   | 9/1998 | Simonetti | | |
| 6,056,297 | A |   | 5/2000 | Harkrader et al. | | |
| 7,407,442 | B2 | * | 8/2008 | Terashima | ................... | 464/173 |
| 7,445,242 | B2 | * | 11/2008 | Yamaguchi et al. | ......... | 280/780 |
| 7,641,561 | B2 | * | 1/2010 | Moriyama et al. | .......... | 464/173 |
| 2004/0256849 | A1 | * | 12/2004 | Suzuki et al. | ............... | 280/779 |
| 2005/0250586 | A1 | * | 11/2005 | Yamada et al. | .............. | 464/170 |
| 2006/0125194 | A1 | * | 6/2006 | Toriumi | ..................... | 277/634 |

* cited by examiner

*Primary Examiner*—Paul N Dickson
*Assistant Examiner*—Robert A Coker
(74) *Attorney, Agent, or Firm*—Ralph E. Smith

(57) ABSTRACT

A seal used in a vehicle steering assembly. The seal comprising a first member carried by a steering component, and a second member carried by a vehicle panel. When installing the steering component in the steering assembly, the first member mates with the second member to form at least one seal. A method is also provided for installing the seal in the vehicle steering assembly.

19 Claims, 4 Drawing Sheets

FIG_ 1

SEAL FOR STEERING ASSEMBLIES

CROSS-REFERENCE TO RELATED APPLICATION(S)

This application claims the benefit of U.S. Provisional Application No. 60/868,142, filed Dec. 1, 2006.

FIELD OF THE INVENTION

The present invention relates generally to seals, and more particularly to seals used in steering assemblies.

BACKGROUND OF THE INVENTION

Steering assemblies for vehicles often include a steering column having a steering shaft that extends between a steering wheel and a steering gear. Typically the steering wheel and gear are separated by a vehicle panel such as a dash panel, a fire wall, or both—the wheel being on a passenger side of the dash panel, and the gear being on an engine side of the dash panel. Thus, the steering shaft and gear are sometimes assembled through an opening in the dash panel. In such cases, a seal is commonly provided at this opening to, among other things, shield it from dirt, fumes, and to dampen noise and vibration.

SUMMARY OF THE INVENTION

One implementation of a presently preferred seal that is used in a vehicle steering assembly comprises a first member carried by a steering component and a second member carried by a vehicle panel. When installing the steering component in the steering assembly, the first member mates with the second member to form at least one seal.

Another implementation of a presently preferred seal that is used in a vehicle steering assembly comprises a grommet seal and a dash seal. The grommet seal is sized to receive a steering gear, and the dash seal is constructed to be inserted in an opening in a dash panel.

Another implementation of a presently preferred method of installing a seal in a vehicle steering assembly comprises the steps of providing a grommet seal and dash seal, mounting the grommet seal on a steering gear, mounting the dash seal in a dash panel, inserting the steering gear in the dash panel, and sealing the two seals against one another.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
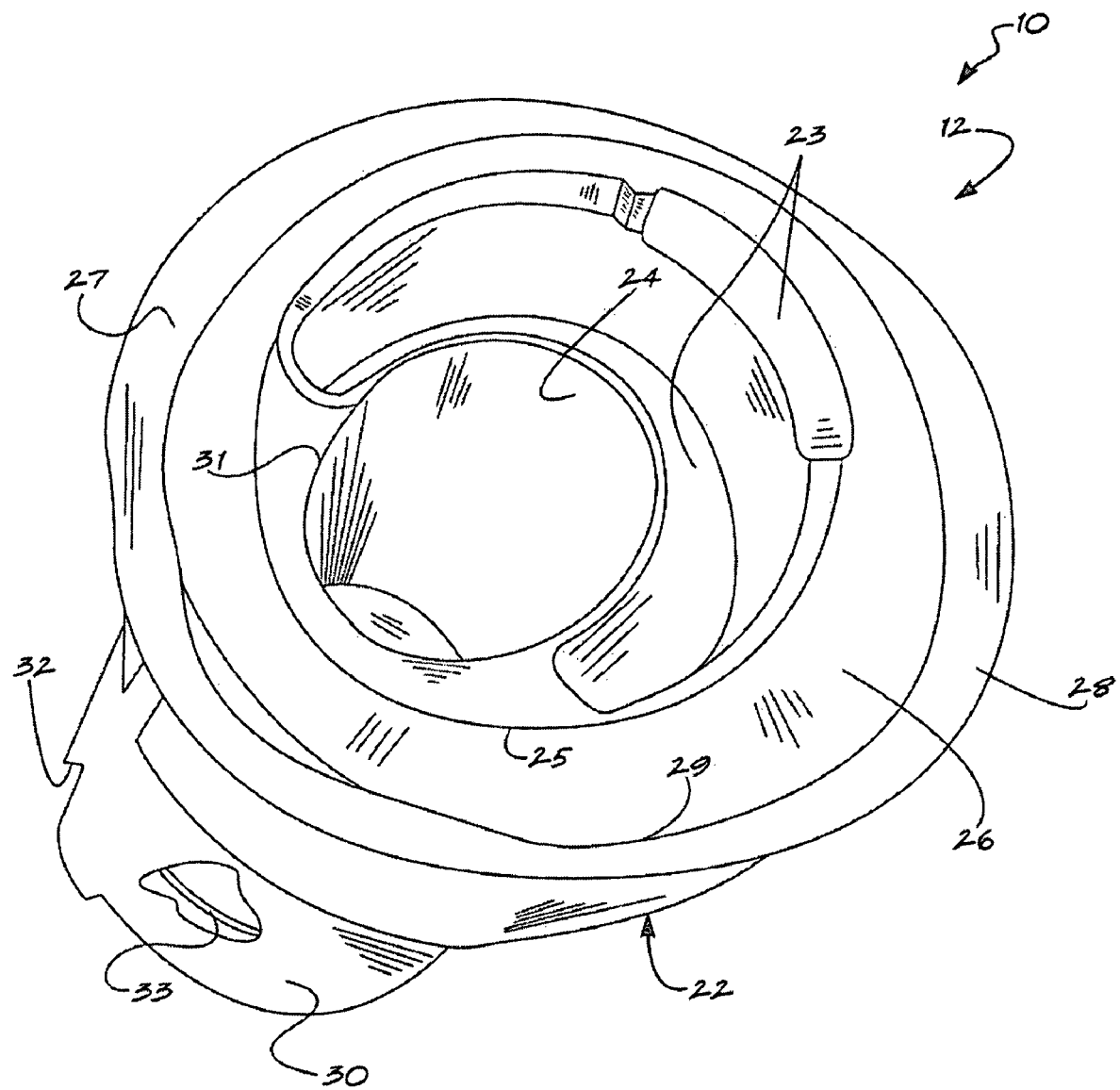
FIG. 1 is a perspective view with a portion broken away of an embodiment of a first member used in a vehicle seal.

Referring in more detail to the drawings, FIGS. 1-5 show an exemplary vehicle seal 10 used in a steering assembly. Vehicle seal 10 can have a pair of members including a first member and a second member—in one embodiment, the first member can be a grommet seal 12, and the second member can be a dash seal 14. In any case, these members can provide one or more seals between each other, with a vehicle panel such as a dash panel 20 or a fire wall or both, and with a steering component such as a steering gear 16. Particularly, these seals can be formed when the first member is used with steering gear 16 and when the second member is used in an opening 18 in dash panel 20.

Figure 2:
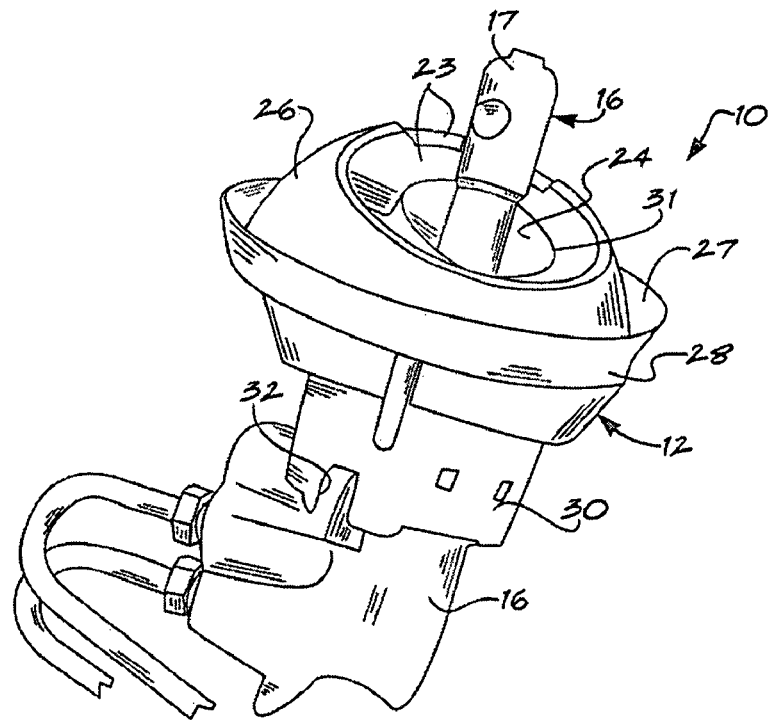
FIG. 2 is a perspective view that shows the first member of FIG. 1 carried by a steering component.

Referring to FIGS. 1 and 2, grommet seal 12 generally forms at least one seal with dash seal 14 when steering gear 16 is assembled to a steering shaft (not shown). Specifically, grommet seal 12 can form a double seal with dash seal 14 when steering gear 16 is inserted through opening 18. Among other things, the grommet seal helps fit the steering gear into the dash seal when the steering gear is inserted in the dash seal, and at the same time it partly shields the dash seal from the steering component. Grommet seal 12 can be made by a dual-shot injection molding process to be part hard plastic, such as polypropylene 20% talc-filled, and part soft plastic, such as a rubber-based resin. The grommet seal can comprise several parts including a body 22 defining a passage 24, a convex or tapered annular surface 26, an elastic lip 28, and an elastic pilot feature 30. Body 22 can be made out of the above hard plastic to serve as the core or base of grommet seal 12. Body 22 can also define several indentations 23 that are sunk in the end of the body and are adjacent convex surface 26. These indentations allow a tool to grab the grommet seal and mount the grommet seal on the steering gear during assembly. Passage 24 can be sized to receive a part of steering gear 16 after this mounting step. As such, the passage is shaped as a cylinder that begins at a circular opening 31 and extends completely through body 22 from the indentation end and to the elastic pilot feature end.

Convex surface 26 can be formed in, or carried by, the body and can constitute a continuous sealing surface. In this embodiment, its otherwise convex shape is interrupted at an end 25 by indentations 23 and passage 24 so that the convex surface is only partially convex or tapered. And this convex or tapered shape can extend in one direction from end 25 to another end 29, and in another direction circumferentially around body 22. Convex surface 26, like body 22, can be made out of the hard plastic. Elastic lip 28 has an inward facing surface 27 that constitutes another continuous sealing surface. The elastic lip can be made out of the above soft plastic and can flex inward and outward about its attachment to body 22. Elastic lip 28 can extend away from and around the midway periphery of body 22 where it generally follows the circumferential end 29 of convex surface 26. Elastic pilot feature 30 can also be made out of the soft plastic. The elastic pilot feature is used to facilitate mounting grommet seal 12 onto steering gear 16. Elastic pilot feature 30 can extend from an end of body 22 opposite indentations 23. The elastic pilot feature can include a pair of recesses 32 formed in its end, and can further include an annular rib 33 formed on its inner surface. During mounting, recesses 32 can each receive a part of the steering gear's body, such as with an interference or snap-fit. This way grommet seal 12 can be mounted on steering gear 16, held thereon, and prevented from rotating without using external fasteners. The annular rib 33 can constitute another continuous sealing surface. The rib 33 may extend circumferentially around the inner surface of pilot feature 30 and protrudes radially inward from the inner surface.

Figure 3:
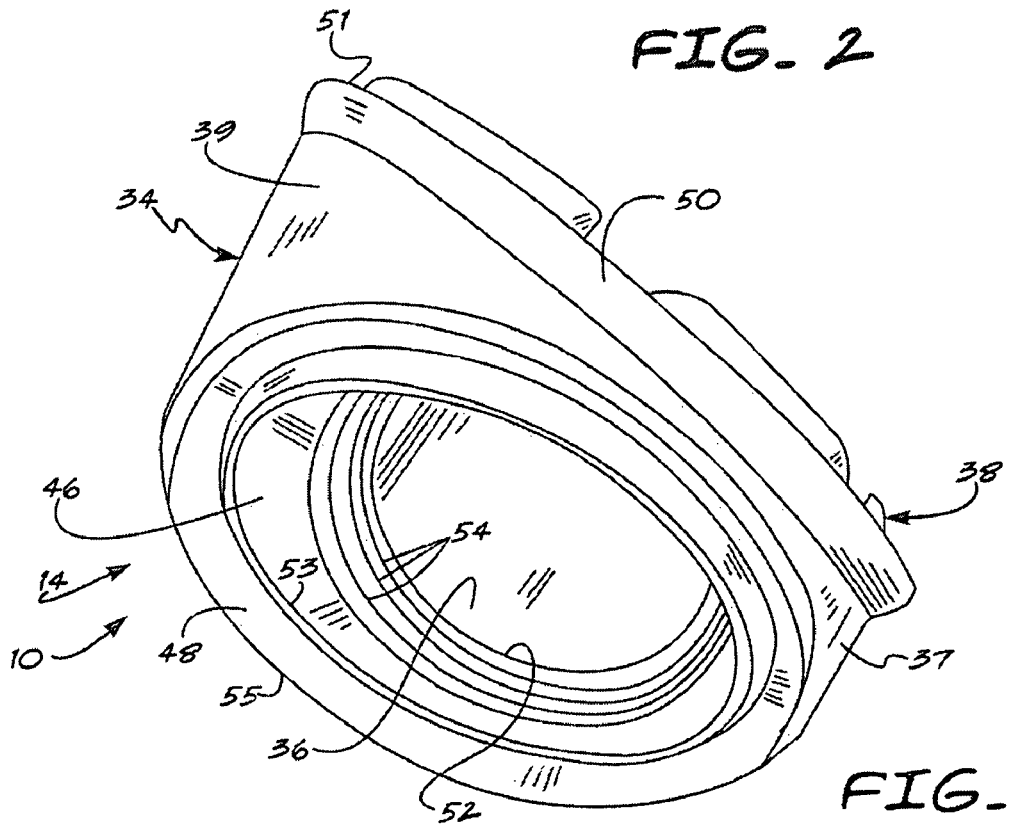
FIG. 3 is a perspective view of an embodiment of a second member used in the vehicle seal.
Figure 4:
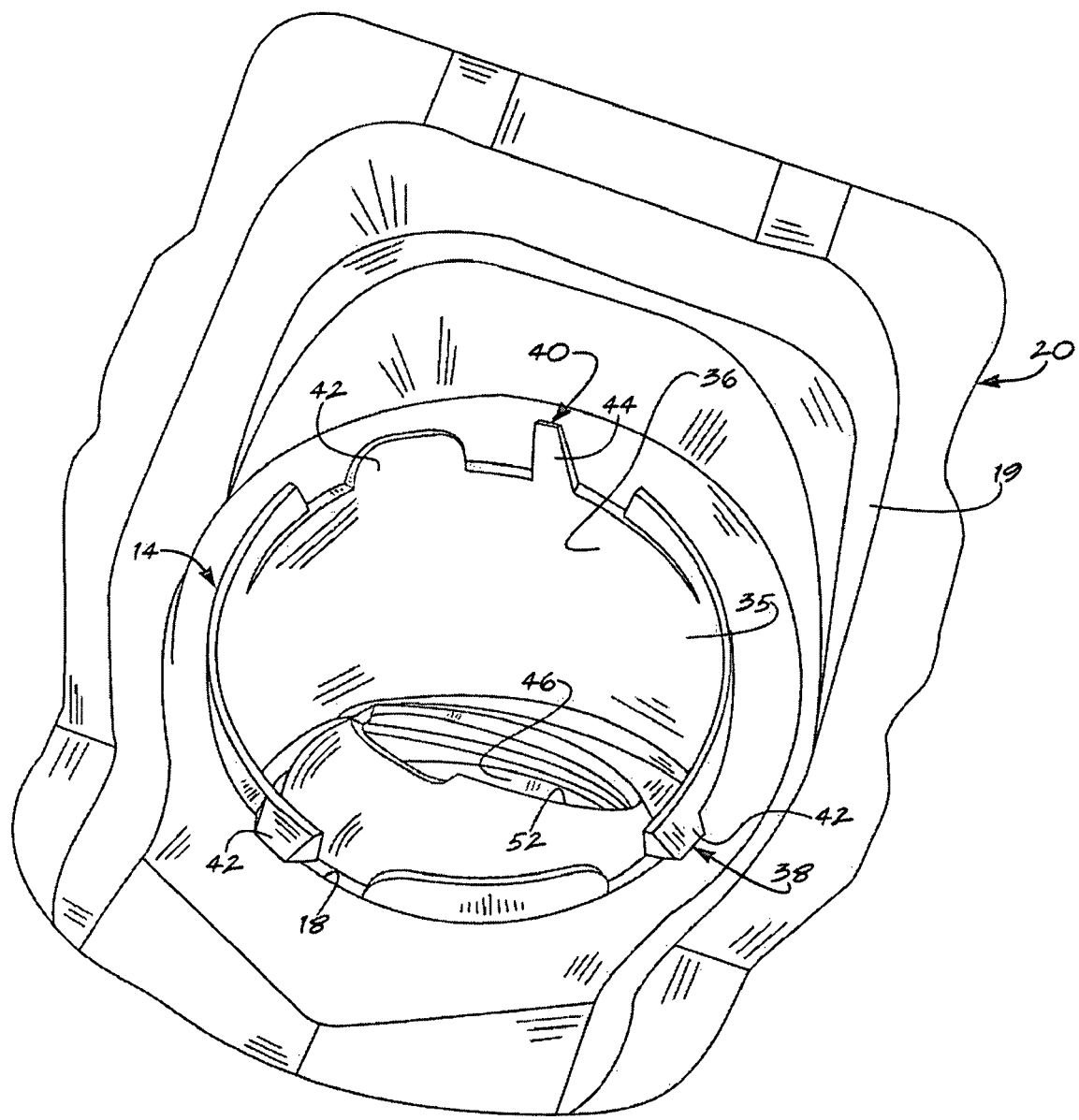
FIG. 4 is a perspective view that shows the second member of FIG. 3 carried by a dash panel.

Referring now to FIGS. 3 and 4, dash seal 14 generally forms at least a single seal between it and dash panel 20. Specifically, in one embodiment, dash seal 14 can be constructed to be inserted in opening 18 and forms a seal around the opening when it is secured in the opening. As stated earlier, the dash seal can also form a double seal with grommet seal 12. And like the grommet seal, dash seal 14 can be made by a dual-shot injection molding process to be part hard plastic, such as polypropylene 20% talc-filled, and part soft plastic, such as a rubber-based resin. Dash seal 14 can comprise several parts including a body 34 defining a passage 36, and the body can further have a hardened portion 35 (FIG. 4) and an elastic portion 37 (FIG. 3). Passage 36 can be sized to receive part of steering gear 16 and part of grommet seal 12; as such, the passage extends completely through the body.

Hardened portion 35 can serve as the core or base of the dash seal. It can be made out of the above hard plastic to have a thickness of approximately three millimeters. The hardened portion can further include a snap-in feature 38 and an indexing feature 40. As best shown in FIG. 4, snap-in feature 38 permits snap-fit insertion and retention of dash seal 14 into opening 18. This way the dash panel can carry the dash seal without using external fasteners. The snap-in feature can be located at one end of dash seal 14 where it extends from a periphery of passage 36. Snap-in feature 38 can further include three clips 42 that are equally spaced about the periphery of passage 36. Each clip 42 can have a slanted outer surface and can be somewhat resilient so that it will snap into opening 18 when press-fit therein. Each of the three clips can also be designed to break if and when it is subject to an impact force exerted on it that exceeds a predetermined breaking force. This is so dash seal 14 can be severed from dash panel 20 if the steering wheel is impacted, for example, during a vehicle accident. And as mentioned, hardened portion 35 can also include indexing feature 40. The indexing feature guides dash seal 14 into opening 18 before snapping the seal in the opening. Like the snap-in feature, indexing feature 40 can extend from the periphery of passage 36. The indexing feature can include a single tab 44 extending vertically from that periphery and beyond clip 42.

As best shown in FIG. 3, elastic portion 37 can lie over part of hardened portion 35 and can be made out of the above soft plastic to have a thickness of approximately five millimeters, which together with the hardened portion, gives an approximately 8 millimeter thick cylindrical body wall 39. Besides its thickness, the body wall can have a varying height throughout its cylindrical shape. The elastic portion can include a concave surface 46, an annular surface 48, and a lip 50. Concave surface 46 can be formed in elastic portion 37 at an end where it can constitute a continuous sealing surface that complements the shape of convex surface 26 of grommet seal 12. In this embodiment, its otherwise concave shape is interrupted by passage 36 so that the convex surface is only partially concave or tapered. And this concave or tapered shape can extend in one direction from an opening 52 to a circumferential end 53. The concave surface 46 can be generally located within and surrounded by cylindrical wall 39. As noted, concave surface 46 defines an opening 52 that leads to passage 36, and can further include ribs 54 along its outer surface. Ribs 54 can form a closer fit between dash seal 14 and grommet seal 12. These ribs can extend around concave surface 46 and can be spaced parallel with each other.

Annular surface 48 can be formed generally flat and can lie in a plane that is inclined with respect to a center axis of passage 36, and can constitute another continuous sealing surface of dash seal 14. The annular surface can be located just outside of concave surface 46 where it is sized to complement the shape of surface 27 of elastic lip 28. The annular surface can extend in one direction from end 53 to an edge 55. Lip 50, on the other hand, can be located opposite the annular surface and can form a seal with dash panel 20 continuously around opening 18. At the opening, a bottom surface 51 can constitute another continuous sealing surface of the dash seal. In this embodiment, lip 50 can simply be a radially expanded end of body 34.

When using this exemplary vehicle seal 10, grommet seal 12 is mounted on steering gear 16 so that it is carried thereby. This mounting can be done by the before-mentioned tool or simply by an operator, and can be done before the steering gear is installed in the steering assembly. In any case, an end 17 of steering gear 16 is inserted through passage 24 and grommet seal 12 is slid down steering gear 16 so that end 17 protrudes out of opening 31. At the other end of grommet seal 12, recesses 32 each receive a part of steering gear 16 as these parts are press-fit therein. Grommet seal 12 is now secured on steering gear 16. In this position, pilot feature 30 fits closely around steering gear 16 and the rib 33 located on the pilot feature's inner surface contacts flush against the steering gear. This contact defines an interface that forms a seal therebetween.

Along with this, dash seal 14 is snapped into opening 18 so that it is carried by dash panel 20. This snapping can also be done by a tool or simply by an operator, but again it can be done before the steering gear is installed in the steering assembly. As dash seal 14 approaches opening 18, tab 44 of indexing feature 40 locates an edge of opening 18 so clips 42 of snap-in feature 38 are aligned therewith. The clip's slanted outer surfaces find the edge of opening 18 and are flexed or squeezed inward as the dash seal 14 is forced in the opening. Once beyond the edge, each clip 42 returns to its unflexed position with a portion of each clip overlying an inner surface 19 of dash panel 20 to secure the dash seal in the dash panel. In this position, lip 50 is held closely around opening 18 so that bottom surface 51 continuously contacts an outer surface 21 of dash panel 20. This contact defines an interface that forms a seal therebetween.

Figure 5:
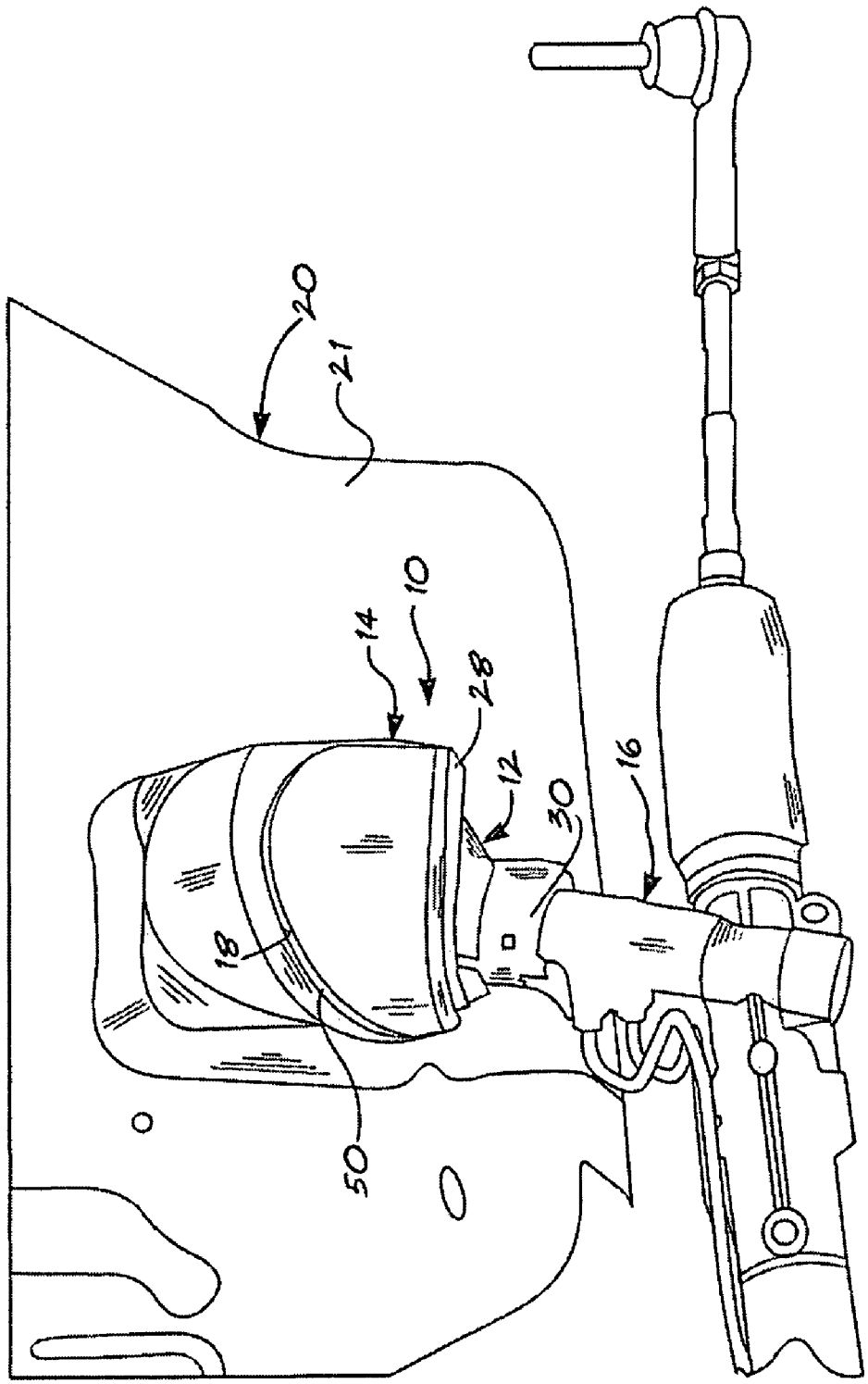
FIG. 5 is a perspective view that shows an embodiment of the vehicle seal installed in a steering assembly.

And once vehicle seal 10 is installed, steering gear 16 can be installed in the steering assembly; that is, it can be assembled to the steering shaft through opening 18 in dash panel 20. This assembly step can be a part of a larger decking operation of the steering assembly. In this step, steering gear 16 is moved toward opening 18 with end 17 protruding out of grommet seal 12 leading the way. End 17 is inserted first through opening 52 of dash seal 14, and then eventually through opening 18 where it can reach the steering shaft. As shown in FIG. 5, once inserted, dash seal 14 partly encloses grommet seal 12 as the two seals mate, and several seals can be formed. For example, a first seal can be formed between convex surface 26 and concave surface 36 as the two bear and are held against each other by a force coming from the assembled steering gear and steering shaft. Likewise, a second seal can be formed between surface 27 of elastic lip 28 and annular surface 48 as the two bear and are held against each other. Like the other seals, these are the result of opposing respective contacting surfaces that define an interface therebetween.

As mentioned throughout, vehicle seal 10 can be used in the steering assembly without using external fasteners. In one sense, the seal can be automatically installed as the steering assembly is put together; that is, the grommet seal and the dash seal can be automatically mated as the steering gear is assembled to the steering shaft. While this may reduce steps in its installation and in a steering assembly decking operation, external fasteners can still be used to secure the vehicle seal members if so desired.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A seal used in a vehicle steering assembly, comprising:
   a first member carried by a steering component of the steering assembly and having a body defining a passage that is sized to receive at least part of the steering component therethrough; and
   a second member separate from the first member and having an end that is configured to be fit within an opening in a vehicle panel when the second member is separate from the first member, whereby when the steering component is installed in the steering assembly, the first member mates with the second member to form at least one seal therebetween.

2. The seal of claim 1 wherein the first member has an elastic pilot feature extending therefrom that press-fits the first member onto the steering component.

3. The seal of claim 1 wherein a single seal is formed between the second member and the vehicle panel, a single seal is formed between the first member and the steering component, and a double seal is formed between the first member and the second member.

4. The seal of claim 1 wherein the first member has a partially convex surface and the second member has a complementary concave surface that, when the steering component is installed in the steering assembly, bear against each other to form a first seal therebetween.

5. The seal of claim 4 wherein the first member further has an elastic lip extending therefrom and the second member has an annular surface that, when the steering component is installed in the steering assembly, bear against each other to form a second seal therebetween.

6. The seal of claim 1 wherein, when mated, the first member is inserted into the second member such that the second member partly encloses the first member to form the at least one seal therebetween.

7. The seal of claim 1 wherein the first member is a grommet seal and the steering component is a steering gear, further wherein the second member is a dash seal that snaps in the opening in the vehicle panel, and whereby the at least one seal is formed when the steering gear is inserted through the opening in the vehicle panel.

8. A seal used in a vehicle steering assembly, comprising;
   a first member carried by a steering component of the steering assembly and having a body defining a passage that is sized to receive at least part of the steering component therethrough; and
   a second member having an end that is configured be fit within an opening in a vehicle panel, whereby when the steering component is installed in the steering assembly, the first member mates with the second member to form at least one seal therebetween,
   wherein the end of the second member has a snap-in feature and an indexing feature that both aid in snapping the second member into the opening in the vehicle panel.

9. The seal of claim 8 wherein the snap-in feature includes three clips, each clip being designed to break when subject to a force exerted on the clip that exceeds a predetermined breaking force so as to sever the second member from the vehicle panel.

10. A seal used in a vehicle steering assembly, comprising:
    a grommet seal having a partially convex surface and a body defining a passage that is sized to receive a steering gear therethrough; and
    a dash seal constructed to be inserted in an opening in a dash panel separately from the grommet seal, the dash seal having a body defining a passage and having a hardened portion and an elastic portion with a partially concave surface complementing the convex surface of the grommet seal.

11. The seal of claim 10 wherein the dash seal body is made by a dual-shot injection molding process to form the hardened portion and the elastic portion, whereby the elastic portion lies over the hardened portion.

12. The seal of claim 10 wherein the dash seal elastic portion has the partially concave surface located at one end of the body, the concave surface defining an opening that leads to the dash seal passage, and further wherein the elastic portion has a lip located at an opposite end of the body.

13. A seal used in a vehicle steering assembly, comprising:
    a grommet seal having a partially convex surface and a body defining a passage that is sized to receive a steering gear therethrough; and
    a dash seal constructed to be inserted in an opening in a dash panel, the dash seal having a body defining a passage and having a hardened portion and an elastic portion with a partially concave surface complementing the convex surface of the grommet seal,
    wherein the grommet seal further has an elastic lip extending therefrom and an elastic pilot feature including a pair of recesses used to mount the grommet seal onto the steering gear.

14. A seal of used in a vehicle steering assembly, comprising:
    a grommet seal having a partially convex surface and a body defining a passage that is sized to receive a steering gear therethrough; and
    a dash seal constructed to be inserted in an opening in a dash panel, the dash seal having a body defining a passage and having a hardened portion and an elastic portion with a partially concave surface complementing the convex surface of the grommet seal,
    wherein the dash seal hardened portion has a snap-in feature that is constructed to snap the dash seal in the opening in the dash panel, further wherein the hardened portion has an indexing feature that guides the dash seal in the opening.

15. The seal of claim 14 wherein the snap-in feature includes three clips extending from a periphery of the dash seal passage that are constructed to snap the dash seal in the opening in the dash panel, and wherein the indexing feature includes a tab that guides the dash seal in the opening.

16. A method of installing a seal in a vehicle steering assembly, comprising:
    providing a grommet seal and a dash seal;
    mounting the grommet seal on a steering gear while separated from the dash seal;
    mounting the dash seal in an opening in a dash panel while separated from the grommet seal;
    inserting the steering gear into the opening in the dash panel; and
    sealing the grommet seal against the dash seal.

17. The method of claim 16, wherein the providing step further comprises providing the grommet seal with a partially convex surface and an elastic lip, and providing the dash seal with a partially concave surface and an annular surface.

18. The method of claim 17, further comprising the step of mating the grommet seal with the dash seal such that the convex surface bears against the concave surface to form a first seal therebetween, and such that the elastic lip bears against the annular surface to form a second seal therebetween.

19. The method of claim 16, wherein both of the mounting steps are performed without using external fasteners.

* * * * *